United States Patent Office 2,798,737
Patented July 9, 1957

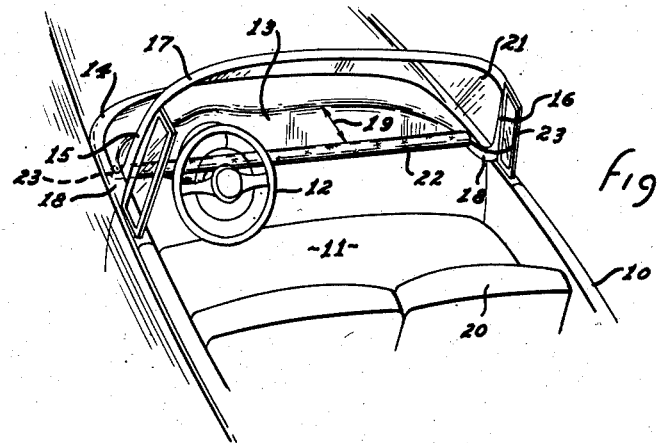
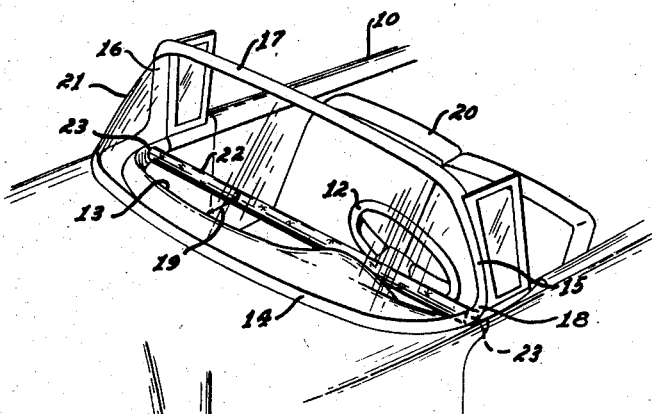
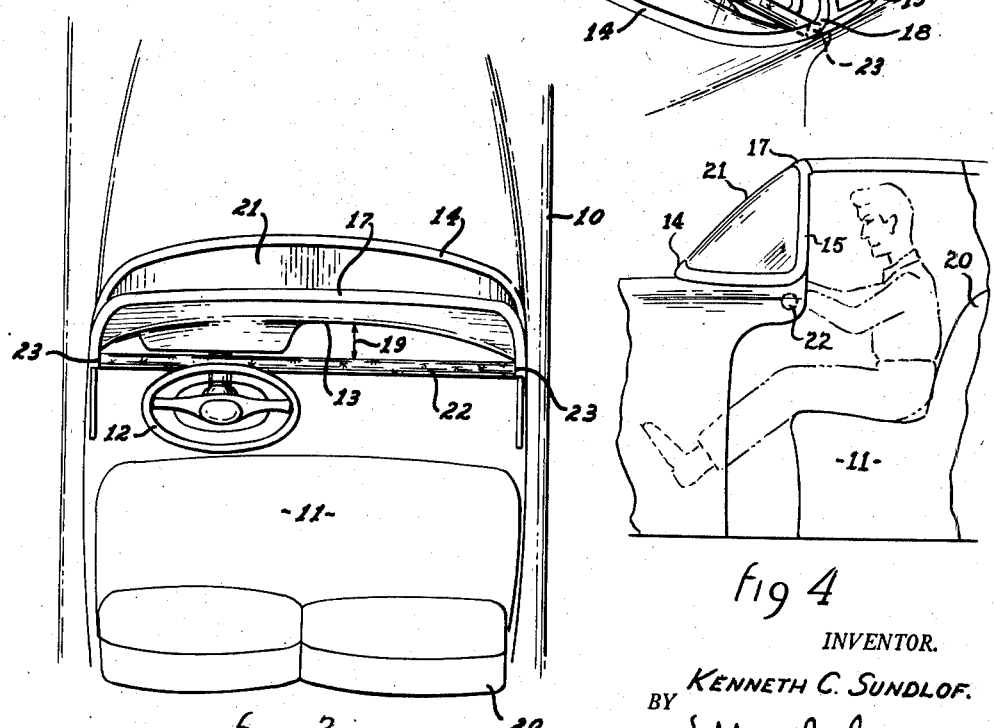

2,798,737
CRASH BAR FOR AUTOMOBILE WINDSHIELD

Kenneth C. Sundlof, Phoenix, Ariz.

Application July 15, 1954, Serial No. 443,629

3 Claims. (Cl. 280—150)

This invention pertains to improvements in crash or safety bars for automobile windshields and is particularly directed to an improved safety bar structure which provides a combination of rigidity of the body of the vehicle and windshield structure together with a safety device and hand grip bar for the occupants of the vehicle.

Still another object of this invention is to provide an improved safety device to prevent the occupants in the front seat of a vehicle from being thrown into or through the windshield in case of an emergency stop or crash.

Still another object of this invention is to provide an improved safety crash bar for protecting the occupants from being thrown into the windshield of the vehicle while at the same time providing an assist bar for getting into or out of the vehicle or in holding to a stabilizing member over rough and curved roads during the operation of the vehicle.

Further features and advantages of this invention will appear from a detailed description of the drawings in which:

Fig. 1 is a rear perspective view of the crash or safety bar for automobile windshields.

Fig. 2 is a front perspective view of the apparatus shown in Fig. 1.

Fig. 3 is a plan view of the apparatus shown in Figs. 1 and 2.

Fig. 4 is a fragmentary left side view (with door open) of the arrangement shown in Figs. 1, 2 and 3.

As exemplary of one embodiment of this invention there is shown a motor vehicle having the usual body 10 having the usual front seat 11, steering wheel 12, and dash board 13. In modern day automobiles the windshield frame comprises the horizontal hoop portion 14, the vertical portions 15 and 16 and the top cross member 17. Usually, the dash board 13 sets back a considerable distance from the points of intersection 18 of the vertical portions 15 and 16 with the horizontal hoop portion 14, as indicated by the dimension 19. It is also to be noted that the dash board 13 is a very considerable distance in modern day cars from the back portion 20 of the front seat 11.

Because of these facts invariably when a serious head-on collision occurs the party in the front seat on the right side flies through space until he engages the dash and windshield, and since the windshield glass 21 slopes backwardly and upwardly the head of the occupant on the right side of the front seat invariably strikes this glass and is projected therethrough particularly before any other portion of the occupant's body engages the dash board or other parts of the vehicle to prevent such movement.

It is therefore the purpose of applicant's present invention to provide a suitable obstruction or safety bar critically located in the present vehicle construction which will prevent such serious injury and loss of life due to the facts recited above. To this end there is provided a bar or rod 22 which is securely connected to the windshield frame at the intersection of the vertical portions 15 and 16 and the horizontal hoop portion 14 as best seen at 23 in Figs. 1 and 2. This rod is nicely spaced as by the distance 19, Fig. 2, from the dashboard and sufficiently far behind the windshield glass 21 that the occupant striking the bar during an emergency stop or crash will not come in contact with the windshield glass. Further, the crash bar 22 is to be covered with a suitable cushion and soft material which may be readily grabbed or bumped against by the occupant without serious harm or injury. It will be further noted that this tie bar 22 serves to rigidify the windshield frame structure 14, 15, 16 and 17 at its critically weak point so as to give added strengh to this portion of the automobile structure in the event the car is rolled over or otherwise struck by an outside object in this area. Further, it will be noted that the bar 22 serves as an assist medium for getting out of the front seat and getting back in again in addition to forming a nice handle bar to hold on to during rough road driving.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. In a crash bar arrangement for an automobile having a body, a front seat, a dashboard, a windshield, and a windshield frame comprising a horizontal hoop portion having rearwardly extending ends, vertical side portions fixed to said rearwardly extending ends of said horizontal hoop portion and extending upwardly therefrom, a top cross member fixed to the upper ends of said vertical side portions, and a transversely disposed horizontal crash bar fixed to said windshield frame at the points of intersection of said vertical side portions, with said horizontal hoop portion and positioned in front of dashboard between said windshield and the front seat of said automobile, said crash bar serving to prevent relative lateral movement between said points of intersection of said portions of said hoop portion so as to avoid inadvertent opening of the automobile doors and said crash bar providing means to prevent injurious contact of the occupants of the front seat with the dashboard and windshield of the automobile during a collision.

2. In a crash bar arragement for an automobile having a body, a front seat, a windshield, a dashboard below said windshield, and a windshield frame comprising a horizontal hoop portion having rearwardly extending ends, vertical side portions fixed to said rearwardly extending ends of said horizontal hoop portion and extending upwardly therefrom, a top cross member fixed to the upper ends of said vertical side portions, a transversely disposed horizontal crash bar fixed to said windshield frame at the points of intersection of said vertical side portions with said horizontal hoop portion and extending in front of said dashboard between said windshield and said front seat, and a crash cushion padding means surrounding said bar.

3. A windshield frame structure for an automobile comprising, a horizontal hoop portion having rearwardly extending ends, vertical portions fixed to and extending upwardly from said rearwardly extending ends of said horizontal hoop portion, a top cross member formed integral with said vertical portions, a padded crash bar rigidly fixed to said frame at the points of intersection of said vertical portions with said rearwardly extending ends of said horizontal hoop portion, and a dashboard connected to said horizontal hoop portion and located in horizontal spaced position in front of said crash bar.

References Cited in the file of this patent

UNITED STATES PATENTS

| | | |
|---|---|---|
| 1,619,697 | Brown | Mar. 1, 1927 |
| 1,841,954 | Jellineck | Jan. 19, 1932 |
| 2,072,655 | Tjaarda | Mar. 2, 1937 |
| 2,263,698 | Hodgson | Nov. 25, 1941 |
| 2,620,221 | Romano | Dec. 2, 1952 |
| 2,695,792 | Rumsey | Nov. 30, 1954 |

FOREIGN PATENTS

| | | |
|---|---|---|
| 20,420 of 1912 | Great Britain | Feb. 13, 1913 |
| 311,944 | Italy | Oct. 16, 1933 |